(12) United States Patent
Ingold et al.

(10) Patent No.: US 9,257,213 B2
(45) Date of Patent: Feb. 9, 2016

(54) DIELECTRIC INSULATION MEDIUM

(71) Applicants: Mathias Ingold, Unterengstringen (CH); Thomas Alfred Paul, Baden (CH); Javier Mantilla, Baden (CH); Oliver Cossalter, Fislisbach (CH); Judith Kessler, Oberrohrdorf (CH); Navid Mahdizadeh, Baden (CH)

(72) Inventors: Mathias Ingold, Unterengstringen (CH); Thomas Alfred Paul, Baden (CH); Javier Mantilla, Baden (CH); Oliver Cossalter, Fislisbach (CH); Judith Kessler, Oberrohrdorf (CH); Navid Mahdizadeh, Baden (CH)

(73) Assignee: ABB TECHNOLOGY AG (CH)

( * ) Notice: Subject to any disclaimer, the term of this patent is extended or adjusted under 35 U.S.C. 154(b) by 0 days.

(21) Appl. No.: 13/769,018

(22) Filed: Feb. 15, 2013

(65) Prior Publication Data
US 2013/0221292 A1 Aug. 29, 2013

Related U.S. Application Data

(63) Continuation of application No. PCT/EP2011/072635, filed on Dec. 13, 2011, which is a continuation of application No. PCT/EP2010/070006, filed on Dec. 16, 2010.

(51) Int. Cl.
| | |
|---|---|
| *H01B 3/56* | (2006.01) |
| *H01F 27/02* | (2006.01) |
| *H01H 33/64* | (2006.01) |
| *H02B 7/00* | (2006.01) |
| *H02B 7/01* | (2006.01) |
| *H05K 5/02* | (2006.01) |

(52) U.S. Cl.
CPC ............... *H01B 3/56* (2013.01); *H01F 27/022* (2013.01); *H01H 33/64* (2013.01); *H02B 7/00* (2013.01); *H02B 7/01* (2013.01); *H05K 5/02* (2013.01)

(58) Field of Classification Search
CPC .................................... H01B 3/56; H05K 5/02
USPC .......................................... 252/571; 174/520
See application file for complete search history.

(56) References Cited

U.S. PATENT DOCUMENTS

| | | | |
|---|---|---|---|
| 3,185,734 A | 5/1965 | Fawcett et al. | |
| 3,201,728 A | 8/1965 | McWhirter | |
| 4,052,555 A | 10/1977 | Mears et al. | |
| 4,071,461 A * | 1/1978 | Mears et al. | 252/571 |
| 4,136,121 A | 1/1979 | Martini et al. | |
| 4,162,227 A * | 7/1979 | Cooke | 252/571 |
| 4,166,798 A | 9/1979 | Mastroianni et al. | |
| 4,175,048 A * | 11/1979 | Christophorou et al. | 174/137 B |
| 4,288,651 A | 9/1981 | Wootton | |
| 4,296,003 A * | 10/1981 | Harrold et al. | 252/570 |
| 4,350,838 A | 9/1982 | Harrold | |
| 4,440,971 A * | 4/1984 | Harrold | 174/17 GF |
| 5,399,718 A | 3/1995 | Costello et al. | |
| 5,466,877 A | 11/1995 | Moore | |
| 5,730,894 A | 3/1998 | Minor | |
| 5,858,065 A * | 1/1999 | Li et al. | 95/45 |
| 5,998,671 A | 12/1999 | Van Der Puy | |
| 6,394,107 B1 * | 5/2002 | Kesari et al. | 134/22.1 |
| 6,403,149 B1 | 6/2002 | Parent et al. | |
| 6,478,979 B1 * | 11/2002 | Rivers et al. | 252/2 |
| 7,074,343 B2 | 7/2006 | Minor et al. | |
| 7,128,133 B2 | 10/2006 | Costello et al. | |
| 7,314,576 B2 | 1/2008 | Minor et al. | |
| 7,416,679 B2 | 8/2008 | Minor et al. | |
| 7,736,529 B2 | 6/2010 | Luly et al. | |
| 7,742,283 B2 | 6/2010 | Hama et al. | |
| 7,816,618 B2 * | 10/2010 | Uchii | 218/43 |
| 7,923,630 B2 | 4/2011 | Richardson | |
| 8,080,185 B2 | 12/2011 | Luly et al. | |
| 8,245,512 B2 | 8/2012 | Schwiegel et al. | |
| 2003/0007543 A1 | 1/2003 | Grenfell et al. | |
| 2003/0019841 A1 * | 1/2003 | Kesari et al. | 216/67 |
| 2004/0056234 A1 | 3/2004 | Belt et al. | |
| 2004/0197474 A1 * | 10/2004 | Vrtis et al. | 427/255.28 |
| 2005/0127322 A1 | 6/2005 | Costello et al. | |
| 2006/0210711 A1 | 9/2006 | Hayashi et al. | |
| 2008/0135817 A1 * | 6/2008 | Luly et al. | 252/571 |
| 2009/0095717 A1 * | 4/2009 | Luly et al. | 218/13 |
| 2009/0109604 A1 * | 4/2009 | Yanabu et al. | 361/618 |
| 2012/0085735 A1 | 4/2012 | Uchii et al. | |
| 2012/0145521 A1 | 6/2012 | Glasmacher | |
| 2012/0152904 A1 * | 6/2012 | Hyrenbach et al. | 218/118 |

FOREIGN PATENT DOCUMENTS

| | | |
|---|---|---|
| CA | 2420574 C | 3/2002 |
| CA | 2516996 C | 9/2004 |
| DE | 548450 C | 6/1934 |
| DE | 641963 C | 2/1937 |
| DE | 3215234 A1 | 10/1983 |
| DE | 19519301 A1 | 11/1996 |

(Continued)

OTHER PUBLICATIONS

Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages.).
French Search Report Application No. FR 1057603 Completed: Jan. 17, 2011 2 pages.
French Search Report Application No. FR 1057604 Completed: Jan. 17, 2011 2 pages.
International Preliminary Report on Patentability Application No. PCT/EP2011/072635 Completed: Nov. 19, 2012 11 pages.

(Continued)

*Primary Examiner* — Mark Eashoo
*Assistant Examiner* — M. Reza Asdjodi
(74) *Attorney, Agent, or Firm* — St. Onge Steward Johnston & Reens LLC

(57) ABSTRACT

A dielectric insulation medium including sulphur hexafluoride (SF6) and/or tetrafluoro methane (CF4), in a mixture with at least one further component being an at least partially fluorinated fluoroketone.

47 Claims, 3 Drawing Sheets

(56) References Cited

FOREIGN PATENT DOCUMENTS

| | | | |
|---|---|---|---|
| DE | 202009009305 U1 | 11/2009 | |
| DE | 102009025204 C5 | 1/2013 | |
| EP | 0131922 A1 | 1/1985 | |
| EP | 0545430 A1 | 6/1993 | |
| EP | 0670294 A2 | 9/1995 | |
| EP | 1146522 A1 | 10/2001 | |
| EP | 1261398 B1 | 12/2002 | |
| EP | 1498941 A2 | 1/2005 | |
| EP | 1764487 A1 | 3/2007 | |
| EP | 1933432 A1 | 6/2008 | |
| EP | 2525454 A2 | 11/2012 | |
| FR | 2930019 A1 | 10/2009 | |
| FR | 2955970 A1 | 8/2011 | |
| GB | 1194431 A | 6/1970 | |
| JP | 8306549 A | 11/1996 | |
| JP | 2738997 B2 | 4/1998 | |
| JP | 2879848 B1 | 4/1999 | |
| JP | 11286679 A | 10/1999 | |
| JP | 2000059935 A | 2/2000 | |
| JP | 2005126480 A | 5/2005 | |
| JP | 2007300716 A | 11/2007 | |
| JP | 2010131584 A | 6/2010 | |
| JP | 2010171173 A | 8/2010 | |
| KR | 20070080895 A | 8/2007 | |
| RU | 2276164 C2 | 5/2006 | |
| WO | 0024814 A1 | 5/2000 | |
| WO | 0105468 A2 | 1/2001 | |
| WO | 0250173 A2 | 6/2002 | |
| WO | 02086191 A1 | 10/2002 | |
| WO | 02086192 A1 | 10/2002 | |
| WO | 02103319 A1 | 12/2002 | |
| WO | 03022981 A1 | 3/2003 | |
| WO | 2004090177 A1 | 10/2004 | |
| WO | 2007013169 A1 | 2/2007 | |
| WO | 2007075804 A1 | 7/2007 | |
| WO | 2007136948 A2 | 11/2007 | |
| WO | 2008073790 A2 | 6/2008 | |
| WO | 2010142346 A1 | 12/2010 | |
| WO | 2010146022 A1 | 12/2010 | |
| WO | WO 2010 142346 | * 12/2010 | |
| WO | 2011019456 A1 | 2/2011 | |
| WO | 2011054870 A1 | 5/2011 | |
| WO | 2011090992 A1 | 7/2011 | |
| WO | 2011119421 A1 | 9/2011 | |
| WO | 2012038442 A1 | 3/2012 | |
| WO | 2012038443 A1 | 3/2012 | |

OTHER PUBLICATIONS

International Search Report and Written Opinion of the International Searching Authority Application No. PCT/EP2010/070006 Completed: Oct. 25, 2011; Mailing Date: Nov. 2, 2011 14 pages.

International Search Report and Written Opinion of the International Searching Authority Application No. PCT/EP2011/072635 Completed: Apr. 2, 2012; Mailing Date: Apr. 11, 2012 10 pages.

International Search Report Application No. PCT/EP2011/066351 Completed: Jan. 10, 2012; Mailing Date: Jan. 17, 2012 2 pages.

International Search Report Application No. PCT/EP2011/066352 Completed: Jan. 10, 2012; Mailing Date: Jan. 17, 2012 2 pages.

Brand, "Dielectric Strength, Boiling Point and Toxicity of Gases—Different Aspects of the Same Basic Molecular Properties"; Oct. 1982; pp. 451-456.

3M(tm); "Fluorochemicals in Heat Transfer Applications"; Jun. 21, 2000; 27 pages.

Tume, "Fluoroketone C2F5C(O)CF(CF3)2 as a Heat Transfer Fluid for Passive and Pumped 2-Phase Applications"; 24th IEEE Semi0Therm Symposium; 2008; 8 pages.

Christophorou, et al.; "Gases for electrical insulation and arc interruption : possible present and future alternatives to pure SF6"; NIST Technical Note 1425; Nov. 1997; 48 pages.

3M(tm) Novec(tm) 1230 Fire Protection Fluid—Brochure © 3M 2008; 6 pages.

3M(tm) Flussigkeiten für das Wärmemanagement und Elektro-/Elektronik-Testen—Brochure © 3M 2010; 8 pages.

Cartwright, et al.; "Barrow Offshore Windfarm Design & Build of UKs First OWF Sub-Station"; Vestas KBR; Oct. 2005; 26 pages.

Kynast, et al.; "Basic investigations concerning equipment with liquefied SF6 under extreme low temperatures"; Technical Colloquium; 2011; 8 pages.

Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.

Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

Seimens Alarm Brochure—2005; 40 pages.

Abb, et al.; "Valhall Re-Development Project, Power From Shore"; Mar. 17, 2010; 5 pages.

* cited by examiner

DIELECTRIC INSULATION MEDIUM

FIELD OF THE INVENTION

The present invention relates to a dielectric insulation medium, its use, and to an apparatus for the generation, distribution and/or transmission and/or usage of electrical energy according to the independent claims.

BACKGROUND OF THE INVENTION

Dielectric insulation media in liquid or gaseous state are conventionally applied for the insulation of an electrical active part in a wide variety of electrical apparatuses, such as switchgears or transformers.

In medium or high voltage metal-encapsulated switchgears, for example, the electrically active part is arranged in a gas-tight housing, which defines an insulating space, said insulation space comprising an insulation gas usually with a pressure of up to several bars and separating the housing from the electrically active part, thus preventing flow of electrical current between housing and active parts. Metal-encapsulated switchgears allow for a much more space-saving construction than switchgears which are mounted outdoors and are insulated by ambient air. For interrupting the current in a high voltage switchgear or for extinguishing fault arcs, the insulating gas further functions as an arc extinction gas.

Sulphur hexafluoride ($SF_6$) is a widely used dielectric insulation gas with excellent dielectric strength, when used for insulation purposes, and also with excellent arc extinction strength, when used for example in a circuit breaker for extinguishing of switching arcs or for example in a gas-insulated substation (GIS) for extinguishing fault arcs. Tetrafluoro methane is particularly useful for switching application because of good arc interrupting properties and very low boiling point of $-128°$ C. at 1 bar. The dielectric strength or pressure-reduced breakdown field strengths are about 84 kV/(cm*bar) for $SF_6$ and about 31 kV/(cm*bar) for $CF_4$.

For example, WO 2008/073790 discloses a dielectric gaseous compound which—among other characteristics—has a low boiling point in the range between $-20°$ C. to $-273°$ C., is preferably non-ozone depleting and which has a GWP of less than about 22,200 on a 100 year time scale. Specifically, WO 2008/073790 discloses a number of different compounds which do not fall within a generic chemical definition.

Further, U.S. Pat. No. 4,175,048 relates to a gaseous insulator comprising a compound selected from the group of perfluorocyclohexene and hexafluoroazomethane, and EP-A-0670294 discloses the use of perfluoropropane as a dielectric gas.

EP-A-1933432 refers to trifluoroiodomethane ($CF_3I$) and its use as an insulating gas in a gas-insulated switchgear.

In the search for a suitable substitute of conventional insulation gases, such as SF6 or air, it has been found that by using fluoroketones having from 4 to 12 carbon atoms, an insulation medium can be obtained which has high insulation capabilities, in particular a high dielectric strength, and at the same time an extremely low global warming potential. This invention has previously been filed as international patent application No. PCT/EP2009/057294.

German Utility Model DE 10 2009 009 305 and German Patent DE 20 2009 025 204 B3 also relate to a switching device having an encapsulation that is filled with a filling medium comprising or consisting of a fluoroketone.

Despite of the good dielectric strength of the fluoroketones according to international patent application No. PCT/EP2009/057294, the insulation performance of the respective insulation medium comprising the fluoroketone is often limited due to the relatively high boiling points of the fluoroketones.

This is particularly the case for applications in a low temperature environment. In this case, only a relatively low saturated vapour pressure of the fluoroketone can be maintained without fluoroketone becoming liquefied. This limits the achievable fluoroketone molar ratio in the gaseous phase and would make necessary an increased filling pressure with conventional insulating gases.

For example, the minimal permissible operating temperature of a high or medium voltage gas-insulated switchgear (HV-GIS or MV-GIS) can be typically $-5°$ C. At this temperature, for obtaining a dielectric performance comparable to conventional high-performance insulation media, the required filling pressure of an insulation medium comprising e.g. a fluoroketone having 6 carbon atoms, e.g. $C_2F_5C(O)CF(CF_3)_2$ or dodecafluoro-2-methylpentan-3-one, may still be relatively high and could exceed the filling pressure that can be withstood by usual housing constructions, which is typically about 7 bar for HV GIS applications.

Alternatively or additionally to increasing the filling pressure, the system can be heated (as shown in our PCT/EP2009/057294). If using for example a pure fluoroketone having 6 carbon atoms, e.g. $C_2F_5C(O)CF(CF_3)_2$ or dodecafluoro-2-methylpentan-3-one, as the insulation medium, heating to more than $50°$ C. would be required to achieve a sufficient saturated vapour pressure of the fluoroketone and to obtain the desired insulation performance for more demanding high voltage applications. Such heating is not always feasible or recommended both for economic and ecologic reasons.

In the article by Yamamoto et al, "Applying a Gas Mixture Containing c-$C_4F_8$ as an Insulation Medium", IEEE Transactions on Dielectrics and electrical Insulation, Vol. 8 No. 6, December 2001, it is disclosed that mixtures of c-$C_4F_8$ together with nitrogen, air or carbon dioxide show a nonlinear increase in dielectric strength over the concentration-weighted arithmetic sum of dielectric strengths of the components.

SUMMARY OF THE INVENTION

The object to be achieved by the present invention is thus to provide an insulation medium with very high dielectric strength also for low temperature applications without requiring actively heating the system.

This object is achieved by the subject-matter of the independent claims, namely by the insulation medium, its use and the electrical apparatus according to the independent claims. Preferred or exemplary embodiments of the invention are given in the description and in the dependent claims and any combinations thereof. In particular, the insulation medium may comprise a mixture of different at least partially fluorinated fluoroketones. In other words, dependent claims or dependencies may define several different species of at least partially fluorinated fluoroketones present in the insulation medium.

The present invention thus relates to a dielectric insulation medium comprising
a) sulphur hexafluoride ($SF_6$) and/or tetrafluoro methane ($CF_4$) in a mixture with
b) at least one further component being an at least partially fluorinated fluoroketone.

The term "at least partially fluorinated fluoroketone", as used in the context of the present invention, is to be understood as a compound which is partially hydrogenated and partially fluorinated, or which is fully fluorinated.

According to embodiments, the at least partially fluorinated fluoroketone has a boiling point above −20° C., preferred above −15° C., more preferred above −10° C., even more preferred above −5° C., most preferred above 0° C. The term "boiling point" as used in the context of the present invention is to be understood as boiling point at atmospheric pressure, i.e. at about 1 bar.

According to embodiments, the at least partially fluorinated fluoroketone has a boiling point lower than 50° C., preferred lower than 40° C., more preferred lower than 30° C., even more preferred lower than 20° C., most preferred lower than 15° C.

The dielectric insulation medium according to embodiments can be a gas mixture, which besides the $SF_6$ and also apart from fluoroketone preferably comprises air and/or at least one air component, in particular selected from the group consisting of carbon dioxide ($CO_2$), oxygen ($O_2$) and nitrogen ($N_2$), as buffer or carrier gas.

By using a suitable admixture gas, a further increase in the dielectric strength of the insulation medium can be achieved.

According to a preferred embodiment, suitable admixture gases are selected from the group consisting of fluoroketones containing from 4 to 12 carbon atoms, more preferably fluoroketones containing exactly 5 carbon atoms and/or fluoroketones containing exactly 6 carbon atoms. According to a particularly preferred embodiment, dodecafluoro-2-methylpentan-3-one and/or decafluoro-2-methylbutan-3-one, is used as an admixture gas, as it has been found to have very high insulating properties and an extremely low GWP. A dielectric insulation medium comprising such fluoroketones has been disclosed in the previously filed International Patent Application PCT/EP2009/057294 the disclosure of which is herewith enclosed by reference into this application.

In an aspect of the invention it is shown that mixtures, in particular gas mixtures, of dielectric insulation media of fluoroketones, in particular of fluoroketones containing exactly 5 and/or exactly 6 carbon atoms, with at least one dielectric gas component selected from the group consisting of: nitrogen, air, carbon dioxide, or mixtures thereof, have a nonlinear increase in dielectric strength over an arithmetic partial-pressure-weighted sum of the dielectric strengths of the components. As a measure of dielectric strength, the pressure-reduced breakdown field strength $E_{crit}$ may be used.

Apart from the above gaseous embodiments, it is however also possible that the insulation medium or at least one of its components is in liquid form under certain operational conditions or even permanently. Here, "liquid form" shall be understood broadly to encompass any state of matter or mixture which comprises at least partially a liquid in any form, for example a liquid phase, an aerosol phase, an over-saturated vapour phase or combinations thereof. Such liquid form of the insulation medium or at least one of its components might for example be present for applications in a low temperature environment. In particular, the insulation medium can be a two-phase system comprising the fluoroketone both in liquid and gaseous state. More particularly, the insulation medium can be an aerosol comprising droplets of the fluoroketone dispersed in a gas phase comprising fluoroketone in the gaseous state.

The insulation properties of the insulation gas, and in particular its breakdown field strength, can be controlled by the temperature, pressure and/or composition of the system. If a two-phase system comprising the fluoroketone both in liquid and gaseous phase is used, an increase of the temperature does not only result in an increase of the absolute pressure, but also in an increase of the fluoroketone concentration in the insulation gas due to a higher vapour pressure.

It has been found that for many applications of the insulation gas, such as applications in the medium or high voltage range, a sufficient molar ratio, i.e. the molar ratio of the fluoroketone to the remaining components of the medium (generally the carrier or buffer gas comprising $SF_6$), and thus also a sufficient breakdown field strength can be achieved even at very low operational temperatures e.g. of down to about −30° C. or even −40° C., even without additional measures such as external heating or vaporization.

As mentioned, the insulation medium of such embodiments is particularly useful for electrical applications. The present invention thus also relates to the use of the above-described fluoroketone in a dielectric insulation medium for an apparatus for the generation, transmission, distribution and/or usage of electrical energy.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds. The at least partially fluorinated alkyl chain of the fluoroketones can be linear or branched. In exemplary embodiments, the fluoroketone is a perfluoroketone, and/or the fluoroketone has a branched alkyl chain, in particular an at least partially fluorinated alkyl chain, and/or the fluoroketone contains fully saturated compounds. The expression that "the fluoroketone contains fully saturated compounds" means that both a single fully saturated fluoroketone, i.e. a fluoroketone without any double bond or triple bond, or a mixture of two or more fully saturated fluoroketones may be comprised.

Compared to fluoroketones having a greater chain length with more than 5 carbon atoms, fluoroketones containing 5 carbon atoms have the advantage of a relatively low boiling point, allowing to have a relatively high molar fraction of such 5-carbon fluoroketones in the insulation medium and avoiding the problem of liquefaction even at low temperatures.

According to a preferred embodiment, the fluoroketone is at least one compound selected from the group consisting of the compounds defined by the following structural formulae in which at least one hydrogen atom is substituted with a fluorine atom:

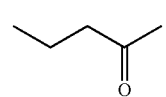

(Ia)

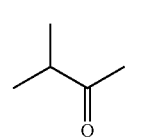

(Ib)

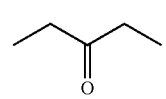

(Ic)

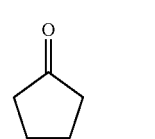

(Id)

Fluoroketones containing 5 or more carbon atoms, here briefly named fluoroketones a), are further advantageous, because they are generally non-toxic with outstanding margins for human safety. This is in contrast to fluoroketones having less than 4 carbon atoms, such as hexafluoroacetone (or hexafluoropropanone), which are toxic and very reactive.

In embodiments of this invention, the fluoroketones, in particular fluoroketones a), having a branched alkyl chain are preferred, because their boiling points are lower than the boiling points of the corresponding compounds (i.e. compounds with same molecular formula) having a straight alkyl chain.

According to embodiments, the fluoroketone a) is a perfluoroketone, in particular has the molecular formula $C_5F_{10}O$, i.e. is fully saturated without double or triple bonds. The fluoroketone a) may more preferably been selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one and 1,1,1,2,2,4,4,5,5,5-decafluoropentan-3-one, 1,1,1,4,4,5,5,5,-octafluoro-3-bis(trifluoromethyl)-pentan-2-one; and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

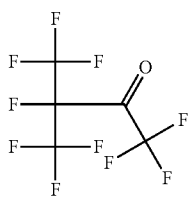

(I)

1,1,1,3,4,4,4-heptafluoro-3-(trifluoromethyl)butan-2-one, here briefly called "C5-ketone", with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with the dielectric carrier gas component b), has very low GWP and has a low boiling point. It has an ozone depletion potential of 0 and is practically non-toxic According to embodiments, the molar fraction of the C5-ketone in the insulation medium ranges from about 5% to about 15%, preferably from about 6% to about 10%, when conventional high voltage GIS pressure filling values are used, and from about 10% to 40%, when conventional medium voltage GIS pressure filling values are used. Such molar ratio ranges have the advantage that liquefaction of the fluoroketone does not occur, even if the insulation medium is used in a low temperature environment, for example down to temperatures of less than 0° C., in particular down to −5° C. In exemplary embodiments, the fluoroketone molar fraction may also be larger than 1%, preferably larger than 2%, more preferred larger than 3%, in particular larger than 3.5%.

According to embodiments, even higher insulation capabilities can be achieved by combining the mixture of different fluoroketone components. In embodiments, a fluoroketone containing exactly 5 carbon atoms, as described above and here briefly called fluoroketone a), and a fluoroketone containing exactly 6 carbon atoms, as described above and here briefly named fluoroketone c), can favourably be part of the dielectric insulation at the same time.

Thus, an insulation medium can be achieved having more than one fluoroketone, each contributing by itself to the dielectric strength of the dielectric insulation medium. In this embodiment, it is particularly preferred that each fluoroketone comprised in the mixture has a partial pressure that corresponds at least approximately to its saturated vapour pressure at least at the minimal operating temperature of the dielectric insulation medium or the electrical apparatus comprising the dielectric insulation medium, respectively; thus a high total molar ratio of the fluoroketones can be obtained and maintained in the gaseous phase, which allows to obtain a very high dielectric strength of the dielectric insulation medium.

Such further fluoroketones preferably contain exactly 4 carbon atoms, and/or exactly 5 carbon atoms, and/or exactly 6 carbon atoms, and/or exactly 7 carbon atoms, and/or exactly 8 carbon atoms.

In embodiments, the further fluoroketone c) is at least one compound selected from the group consisting of the compounds defined by the following structural formulae in which at least one hydrogen atom is substituted with a fluorine atom:

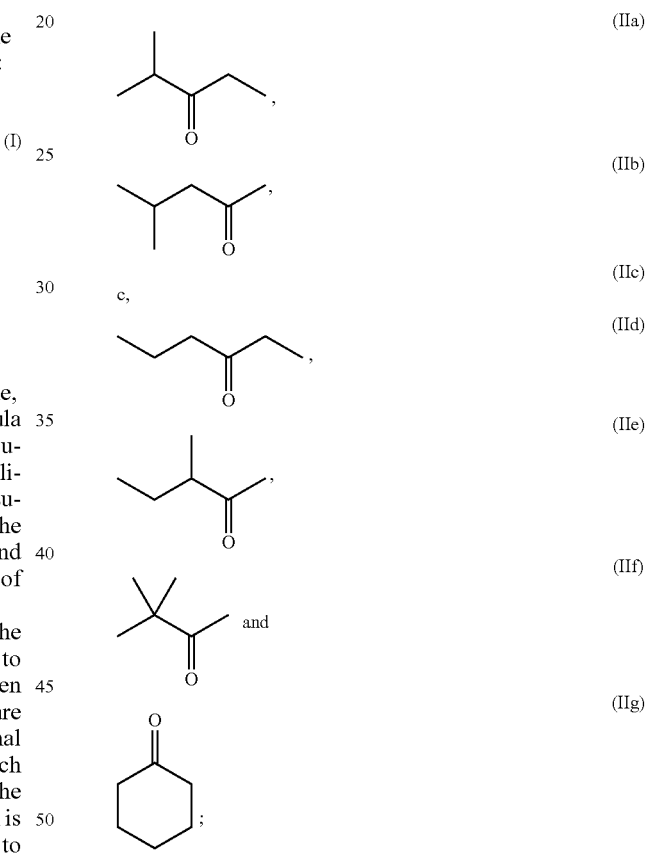

and/or is at least one compound selected from the group consisting of the compounds defined by the following structural formulae in which at least one hydrogen atom is substituted with a fluorine atom:

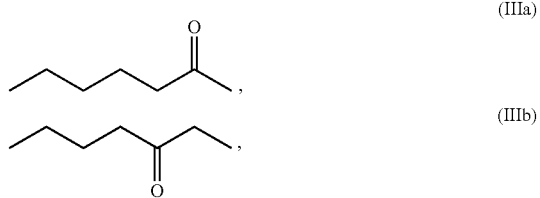

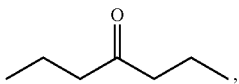 (IIIc)

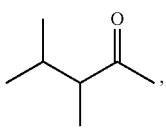 (IIId)

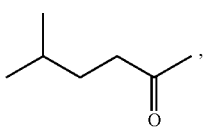 (IIIe)

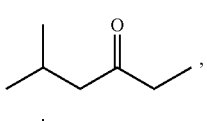 (IIIf)

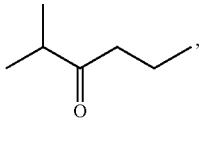 (IIIg)

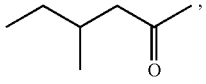 (IIIh)

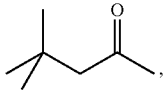 (IIIi)

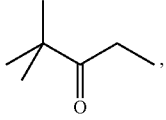 (IIIj)

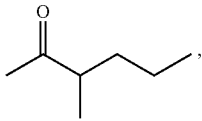 (IIIk)

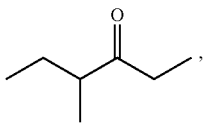 (IIIl)

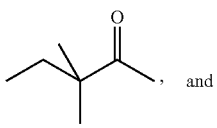 and (IIIm)

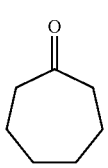 (IIIn)

named dodecafluoro-cycloheptanone.

The present invention encompasses each and every combination of any of the compounds selected from the group consisting of the compounds with the structural formulae Ia to Id, IIa to IIg, IIIa to IIIn.

More preferably, the fluoroketone contains exactly 6 carbon atoms; such a fluoroketone is non-toxic, with outstanding margins for human safety.

In embodiments, fluoroketone c), alike fluoroketone a), is a perfluoroketone, and/or has a branched alkyl chain, in particular an at least partially fluorinated alkyl chain, and/or the fluoroketone c) contains fully saturated compounds. In particular, the fluoroketone c) has the molecular formula $C_6F_{12}O$, i.e. is fully saturated without double or triple bonds. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis-(trifluoromethyl)butan-2-one (also named dodecafluoro-3,3-(dimethyl)butan-2-one), dodecafluorohexan-2-one and dodecafluorohexan-3-one, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

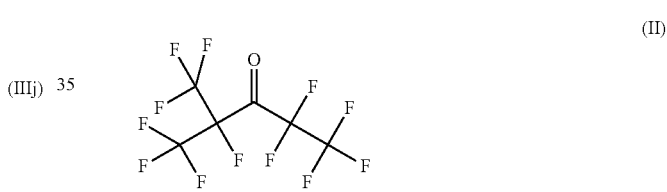 (II)

1,1,1,2,4,4,5,5,5-Nonafluoro-4-(trifluoromethyl)pentan-3-one (here briefly called "C6-ketone", with molecular formula $C_2F_5C(O)CF(CF_3)_2$ has been found to be particularly preferred for high voltage insulation applications because of its high insulating properties and its extremely low GWP. It has an ozone depletion potential of 0 and is non-toxic (LC50 (4 hours) of about 100,000 ppm). Thus, the environmental impact is much lower than with conventional insulation gases, and at the same time outstanding margins for human safety are achieved.

Preferably, the molar fraction of the fluoroketone c) in the insulation medium shall range from about 1% to about 15%, preferably from about 1% to about 10%, more preferred from about 1% to about 4%, most preferred from 1% to 3%, in order to avoid liquefaction of the fluoroketone at low temperatures, for example down to temperatures of less than 0° C., for example down to −5° C. In embodiments the molar fraction may also be larger than 0.1%, preferably larger than 0.5%, more preferably larger than 1%, in particular larger than 2%.

As mentioned above, the insulation medium according to the present invention is particularly useful in electrical applications. The present invention thus also relates to the use of the above-described combination of components as a dielectric insulation medium in an apparatus for the generation and/or transmission and/or distribution and/or usage of electrical energy.

Likewise, the present invention also relates to an apparatus for the generation and/or transmission and/or distribution and/or usage of electrical energy, said apparatus comprising a housing defining an insulating space and an electrical active part arranged in the insulating space. This insulating space comprises the insulation medium described throughout this application.

The term "electrical active part" in this application is to be interpreted broadly including any type of conductor, conductor arrangement, switch, conductive component, surge arrester, and the like, and furthermore shall be understood as any part, that can be activated electrically, i.e. can be subject to voltage, in at least one operating state, i.e. other temporally inactive operating states or locally inactive operating states of the part may still occur.

In particular, the apparatus of the present invention includes a switchgear, in particular an air-insulated or gas-insulated metal (or otherwise)-encapsulated switchgear, or a part and/or component thereof, in particular a bus bar, a bushing, a cable, a gas-insulated cable, a cable joint, a current transformer, a voltage transformer, and/or a surge arrester.

Switchgears, in particular gas-insulated switchgears (GIS), are as such well known to a person skilled in the art. An example of a switchgear for which the present invention is particularly well suited is for example shown in EP-A-1933432, paragraphs [0011] to [0015], the disclosure of which is incorporated herewith by reference.

It is further preferred that the apparatus is a switch, in particular an earthing switch (e.g. a fast acting earthing switch), a disconnector, a combined disconnector and earthing switch, a load-break switch or a circuit breaker, in particular a medium-voltage circuit breaker, a generator circuit breaker and/or a high-voltage circuit breaker. In particular, a high voltage circuit breaker may have a pressure-build-up chamber, e.g. a compression chamber and/or a heating chamber for providing a self-blasting effect, wherein in a switching operation the at least partially fluorinated fluoroketone or fluoroketones is or are decomposed to fluorocarbon compounds having a lower number of carbon atoms, preferably in the pressure-build-up chamber and/or in the arcing region, during an arc-extinguishing phase. Such molecular decomposition of the at least partially fluorinated fluoroketone admixture or admixtures allows to further increase the number of molecules and hence the pressure which is available for extinguishing the arc. As well, molecular decomposition of the at least partially fluorinated fluoroketone(s) also occurs in the arcing region, which further increases the arc-extinguishing blasting pressure. The at least partially fluorinated fluoroketone admixture or admixtures is also helpful in the exhaust region of a circuit breaker, because the rather low dissociation temperature of the not-dissociated at least partially fluorinated fluoroketone functions as a temperature barrier in the exhaust gas. In other words, thermal energy in the exhaust gas can be absorbed by dissociation of undissociated fluoroketone in the exhaust, which prevents further temperature increase in the exhaust region above the dissociation temperature of the fluoroketone. Thus, the dielectric insulation of this application has a good arc extinction capability. Without any intention to be bound by the theory it is assumed that this arc extinction capability can at least partially be attributed to the recombination of the dissociation products of for example the fluoroketone inside the arcing region, for example mainly to tetrafluoromethane ($CF_4$) which is well known to be a highly potent arc extinction medium.

According to another embodiment, the apparatus can be a transformer, in particular a distribution transformer or a power transformer.

According to still other embodiments, the apparatus can also be, e.g., an electrical rotating machine, a generator, a motor, a drive, a semiconducting device, a power electronics device, and/or a component thereof.

The invention particularly relates to a medium or high voltage apparatus. The term "medium voltage" as used herein refers to a voltage in the range of 1 kV to 72 kV, whereas the term "high voltage" refers to a voltage of more than 72 kV. Applications in the low voltage range below 1 kV are feasible, as well.

In order to achieve a desired dielectric rating of the apparatus, such as a required dielectric withstand capability and operating temperature range, the apparatus can comprise a control unit (also referred to as "fluid management system") for controlling individually or in combination: the composition—in particular the chemical composition or the physical phase composition, such as a gas/liquid two-phase system—, and/or the temperature of the insulation medium, and/or the absolute filling pressure, the gas density, the partial pressure and/or the partial gas density of the insulation medium or of at least one of its components, respectively. In particular, the control unit can comprise a heater and/or vaporizer in order to control the vapour pressure of the insulation medium components according to the invention, which is of particular relevance for applications in a low temperature environment down to about −20° C. The vaporizer can e.g. be an ultrasonic vaporizer, or can comprise spraying nozzles for spraying the insulation medium into the apparatus.

In an exemplary embodiment, in particular for high voltage applications in a low temperature environment, a partial pressure of the at least partially fluorinated fluoroketone(s) can be provided in the insulation medium by heating and/or vaporizing, such that the partial pressure of the fluoroketone is maintained at a desired pressure level.

In exemplary embodiments, the apparatus comprises a monitoring device and/or a dosing unit to set the concentration of the at least partially fluorinated fluoroketone(s), in particular according to any dependent claims, in the insulation medium according to the needs of the dielectric insulation capability or dielectric strength.

The term "dielectric insulation capability" or "dielectric strength" in this application shall be understood broadly and may include more specific characterization by an electric breakdown field strength which may be determined under specific measurement conditions. This will exemplarily be shown in more detail below for a medium or high voltage gas-insulated switchgear. Furthermore, the control unit may comprise a measuring unit for measuring the control parameters, such as temperature, density, pressures and/or composition—in particular the liquid phase level—and/or a monitoring unit for monitoring such parameters.

However, preferably the dielectric insulation medium has a composition such that no dosing unit, no temperature control unit, no active temperature control and no vaporization unit is present. In other words, the dielectric insulation medium shall remain gaseous and maintain its dielectric strength under all operation condition and, in particular, at all operating temperatures.

In yet other words, condensation of the dielectric insulation medium of the invention shall be avoided under operating conditions of the electrical apparatus, in particular even at low operating temperatures. This is achieved by using $SF_6$ and/or $CF_4$ in a mixture with fluoroketone. Therein $SF_6$ and/or $CF_4$ are gases having very low boiling points and good dielectric strength or arc extinction capability, however compromising on an increased GWP. The fluoroketone or fluoroketones provides or provide an excellent dielectric strength and excellent GWP close to 1 and have still low enough boiling points (at 1 bar) such that they can be present in the gaseous phase with sufficient partial pressures at all operating temperatures.

In a further aspect of the invention, sulphur hexafluoride $SF_6$ in a mixture with fluoroketone and a further dielectric gas component selected from the group consisting of nitrogen and air, the dielectric strength is increased two-fold, on the one hand by a first nonlinear increase in dielectric strength of the fluoroketone with the nitrogen or air, and on the other hand by a second nonlinear increase in dielectric strength of the sulphur hexafluoride $SF_6$ with the nitrogen or air.

In a yet further aspect of the invention, a dielectric insulation medium and an electrical apparatus comprising c-$C_4F_8$ in a mixture with fluoroketone and a further dielectric gas component selected from the group consisting of nitrogen, air, carbon dioxide, and mixtures thereof, show a dielectric strength that is increased at least two-fold or many-fold, namely on one hand by at least one first nonlinear increase in dielectric strength of the fluoroketone with the nitrogen and/or air and/or carbon dioxide, and on the other hand by at least one third nonlinear increase in dielectric strength of the c-$C_4F_8$ with the nitrogen and/or air and/or carbon dioxide. In combinations comprising three or more compounds, the combined nonlinear increase in dielectric strength may differ in magnitude from pair-wise nonlinear increases in dielectric strengths.

In a yet further aspect of the invention, a dielectric insulation medium, an electrical apparatus and a use as a dielectric insulation medium is disclosed, comprising a first dielectric insulation gas component L) being selected from a first group consisting of: sulphur hexafluoride $SF_6$, perfluorocarbons, tetrafluoro methane $CF_4$, $C_2F_6$, $C_3F_8$, c-$C_4F_8$, trifluoroiodomethane $CF_3I$, nitrogen dioxide $NO_2$, nitric oxide NO, nitrous oxide $N_2O$, and mixtures thereof, in particular sulphur hexafluoride ($SF_6$) and/or tetrafluoro methane ($CF_4$), and/or trifluoroiodomethane ($CF_3I$), in a mixture with at least one gaseous at least partially fluorinated fluoroketone in a dielectric insulation medium, in particular as disclosed above, for an apparatus for the generation and/or transmission and/or distribution and/or usage of electrical energy.

Furthermore, the first group of dielectric insulation gas components L) may also comprise: methane $CH_4$, carbon monoxide CO, hydrogen $H_2$, noble gases, in particular He, Ar, Kr; and mixtures thereof.

Thus, it is herewith also disclosed a dielectric insulation medium, use as dielectric insulation medium and electrical apparatus that comprises a mixture, in particular gas mixture, containing a fluoroketone together with trifluoroiodomethane $CF_3I$. Therefore, in an aspect of the invention, the dielectric insulation medium may be comprising trifluoroiodomethane ($CF_3I$) in a mixture with at least one further component being an at least partially fluorinated fluoroketone. The trifluoroiodomethane ($CF_3I$) may be present as alternative or in addition to sulphur hexafluoride (SF6) and/or tetrafluoro methane (CF4). $CF_3I$ has advantages such as low boiling point and high dielectric strength, and thus may favourably be combined with fluoroketone.

Furthermore, it is herewith also disclosed a dielectric insulation medium, use as a dielectric insulation medium and electrical apparatus that comprises a mixture, in particular gas mixture, containing a fluoroketone together with nitrogen oxides $NO_2$, NO, $N_2O$, in particular $NO_2$. It is assumed that these nitrogen oxides support a nonlinear increase in dielectric strength together with fluoroketones, in particular C5-fluoroketones and/or C6-fluoroketones, as a result of their similar electron attachment cross-sections as nitrogen $N_2$.

In a yet further aspect of the invention, a dielectric insulation medium, a use as a dielectric insulation medium, and an electrical apparatus is disclosed, comprising novel gas mixtures comprising
- at least one first gas component L1) being selected from the first group consisting of: sulphur hexafluoride $SF_6$, perfluorocarbons, tetrafluoro methane $CF_4$, $C_2F_6$, $C_3F_8$, c-$C_4F_8$, $CF_3I$, and mixtures thereof, in particular sulphur hexafluoride ($SF_6$) and/or tetrafluoro methane ($CF_4$), together with
- at least one second gas component L2) selected from the second group L2) consisting of: at least partially fluorinated fluoroketone, fluoroketone comprising exactly 5 carbon atoms, fluoroketone comprising exactly 6 carbon atoms, and mixtures thereof, together with
- at least one third gas component L3) selected from the third group consisting of: nitrogen, air, carbon dioxide, and mixtures thereof.

Optionally, the third group may also comprise nitrogen dioxide $NO_2$, nitric oxide NO, and/or nitrous oxide $N_2O$.

Such novel gas mixtures provide high dielectric breakdown field strengths and/or good arc extinction properties, have relatively low boiling points or low condensation temperatures, and may still provide acceptable levels of GWP of the mixture.

Furthermore, in such a dielectric insulation medium, use as dielectric insulation medium, and electrical apparatus, the mixtures of at least one first gas component L1) with fluoroketone or fluoroketones and in addition together with nitrogen and/or air and/or carbon dioxide show at least one nonlinear increase in dielectric strength. Such at least one nonlinear increase in dielectric strength may be produced by various combinations of the gas components L1), L2), L3), e.g. by L2)/L3), L1)/L3), L1)/L2)/L3). In particular, preferred third gas components L3) are air and nitrogen for dielectric insulation as such, and carbon dioxide for arc extinction.

In embodiments of any of the above aspects of the invention, the dielectric insulation medium, the use as dielectric insulation medium, and the electrical apparatus may further comprise a dielectric insulation gas component M) being selected from a fourth group consisting of: $CHF_3$, $(C_2F_5)_2O$, $(CF_3)_2O$; further perfluorocarbons and in particular $C_2F_4$, $C_3F_6$, $C_4F_{10}$, $C_4F_6$, $C_4F_8$, $C_6F_{10}$, $C_6F_{12}$, $C_6F_{14}$, $C_6F_6$; $C_2F_5COF$, $C_5F_8O_2$, c-$C_4F_7I$, $CF_3CF(CF_3)CF(CF_3)CF_2I$, $CF_3CF_2CF_2CF_2I$, $CF_3CF_2CF_2I$, $CF_3CF_2I$, $CF_3CHFCF_2I$, $CF_3SF_5$, $CH_2F_2$, $CH_3$-c-$C_4F_6I$, $CH_3CF(CF_3)CF(CF_3)CF_2I$, $CH_3CF_2CF_2I$, $CH_3CHFCF(CF_2CF_3)CF_2I$, CO; $N_2$, perfluorodiethyl thioether, perfluoromethyl ethyl thioether, perhalogenated organic compounds, tetradecylfluorohexane, $XeF_2$, $XeF_4$; and mixtures thereof.

Throughout this application, nonlinear increase in dielectric strength means that the mixture, in particular gas mixture, has a dielectric strength that is larger than the concentration-weighted or pressure-weighted arithmetic sum of dielectric strengths of its components.

In exemplary embodiments, however, the dielectric insulation medium shall not comprise a hydrofluoro-monoether; and/or the dielectric insulation medium shall not comprise a hydrofluoro-diether; and/or the dielectric insulation medium shall not comprise a hydrofluoro-polyether.

In other exemplary embodiments, however, the dielectric insulation medium shall not comprise a fluoroketone comprising exactly 5 carbon atoms; and/or the dielectric insulation medium shall not comprise a fluoroketone comprising exactly 6 carbon atoms.

In still other exemplary embodiments, however, the electrical apparatus shall not be a transformer, in particular not a distribution transformer or not a power transformer.

In further exemplary embodiments, however, the dielectric insulation medium shall not be a working medium for a heat pipe, in particular not a working medium for a heat pipe in a transformer.

In exemplary embodiments the above disclaimers shall also apply to the use of the dielectric medium and to the apparatus comprising such an insulation medium.

BRIEF DESCRIPTION OF THE DRAWINGS

The invention is further illustrated by way of the following exemplary figures of which

DETAILED DESCRIPTION OF THE INVENTION

Figure 1:
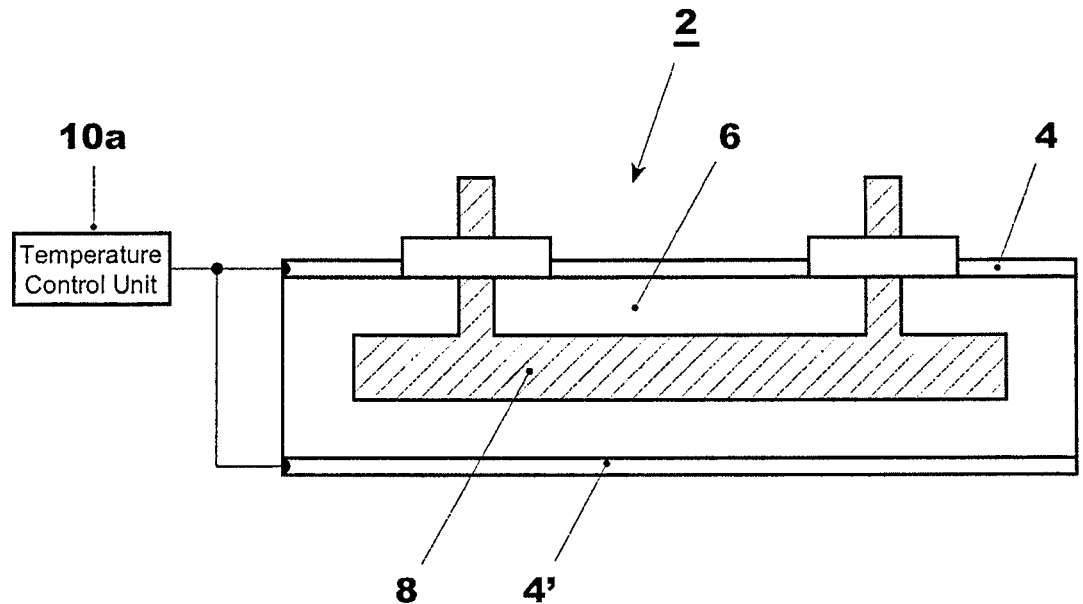
FIG. 1 shows a purely schematic representation of a high voltage gas-insulated switchgear according to an embodiment.

In the following, exemplary embodiments of the invention are discussed:

In the exemplary apparatus of FIG. 1, the dielectric insulation medium shall comprise $SF_6$ and/or $CF_4$, and/or any gas or gas mixtures of the herein mentioned gas types different from fluoroketone and $SF_6$ and $CF_4$, together with at least one component being an at least partially fluorinated fluoroketone, in particular perfluoroketone containing exactly 5 carbon atoms and/or containing exactly 6 carbon atoms.

Preferably, the dielectric strength of the insulation medium shall be higher than that of pure $SF_6$. Further preferred, the insulation medium shall be gaseous without any need for vapourization and/or heating of the insulation medium. In other words, the gas mixture or at least the fluoroketone or fluoroketones shall preferably be present in gaseous state at all operating conditions, in particular at all operating temperatures. In particular, condensation of the fluoroketone or fluoroketones shall be avoided under all operating conditions of the electrical apparatus. This allows to maintain a certain minimal concentration or partial pressure of the fluoroketone or fluoroketones in the gaseous phase under all operating temperatures. In yet other embodiments, even some condensation of the fluoroketone or fluoroketones may be acceptable as long as a certain minimal concentration or partial pressure of the fluoroketone or fluoroketones in the gaseous phase is maintained under all operating temperatures.

In embodiments, the dielectric insulation medium may further comprise di-atomic molecules, that are preferably chemically stable under ambient conditions and, in particular, under normal operating condition of gas-insulated electrical equipment, such as in a temperature range of $-40°$ C. to $+105°$ C. and under few to several bars gas pressure. For example, such gas admixture can comprise air or an air component and for example nitrogen, oxygen carbon dioxide, a nitrogen oxide, or a noble gas; or mixtures thereof.

Apart from the specific dielectric insulation medium, the present invention also relates to an electrical apparatus, as mentioned above. Possibly, the apparatus comprises a control unit (or "fluid management system") in order to adapt the pressure, the composition and/or the temperature of the insulation medium.

Figure 2:
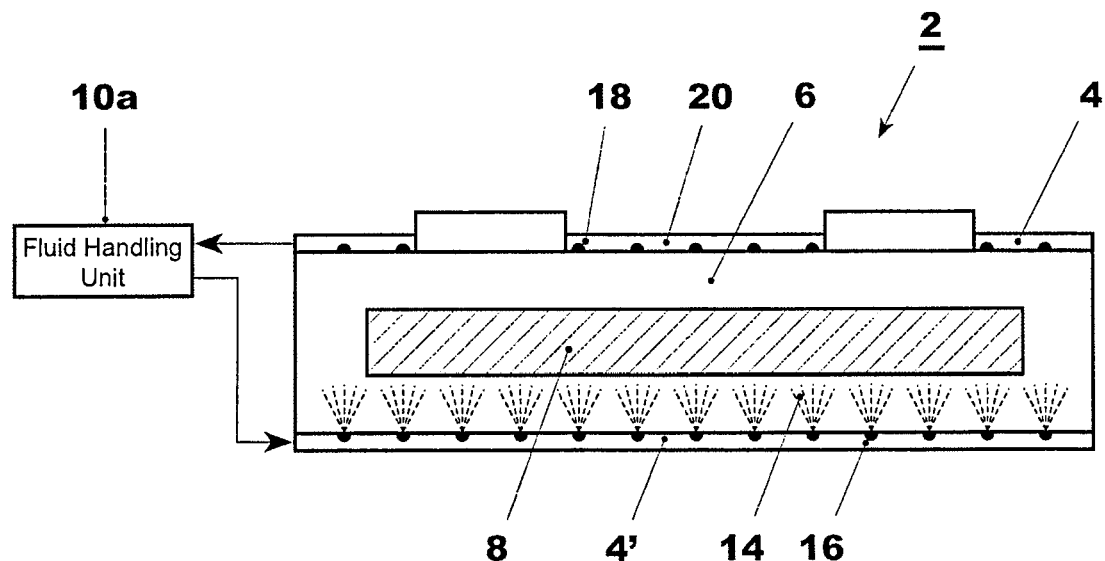
FIG. 2 shows a purely schematic representation of a high voltage gas-insulated switchgear according to an embodiment comprising a fluid handling unit.

In FIG. 1, the switchgear 2 comprises a housing 4 defining an insulating space 6 and an electrical active part 8 arranged inside the insulating space 6. The switchgear 2 further comprises a temperature control unit 10a for setting the housing 4, or at least a part of the housing 4, of the switchgear 2 and thus the insulation medium comprised in the insulating space 6 to a desired temperature. Of course, any other part in contact with the insulation medium can be heated in order to bring the insulation medium to the desired temperature. Thus, the vapour pressure of the at least partially fluorinated fluoroketone—and consequently its molar ratio in the insulation gas—as well as the absolute pressure of the insulation gas can be adapted accordingly. As is also shown in FIG. 2, the at least partially fluorinated fluoroketone is in this embodiment not homogenously distributed throughout the insulating space due to the temperature gradient given in the insulation space 6. The concentration of the at least partially fluorinated fluoroketone is thus higher in close proximity to the walls 4' of the housing 4.

An alternative control unit or fluid management system is schematically shown in FIG. 2, in which a fluid handling unit 10b is attributed to the gas-insulated switchgear as the control unit. According to this control unit 10b, the composition of the insulation medium, and in particular its concentration of the at least partially fluorinated fluoroketone a) and/or fluoroketone c) is adjusted in a dosing unit comprised in the fluid handling unit 10b, and the resulting insulation medium is injected or introduced, in particular sprayed, into the insulating space 6. In the embodiment shown in FIG. 2, the insulation medium is sprayed into the insulating space in the form of an aerosol 14 in which small droplets of liquid fluoroketone are dispersed in the respective carrier gas. The aerosol 14 is sprayed into the insulating space 6 by means of nozzles 16 and the at least partially fluorinated fluoroketone is readily evaporated, thus resulting in an insulating space 6 with an inhomogeneous concentration of the at least partially fluorinated fluoroketone, specifically a relatively high concentration in close proximity to the housing wall 4' comprising the nozzles 16. Alternatively, the insulation medium, in particular a concentration, pressure and/or temperature of the at least partially fluorinated fluoroketone a) and/or fluoroketone c) can be controlled in the fluid handling unit 10b before being injected into the insulation space. In order to ensure circulation of the gas, further openings 18 are provided in the upper wall of the housing 4, said openings leading to a channel 20 in the housing 4 and allowing the insulation medium to be removed from the insulating space 6. The switchgear 2 with fluid handling unit 10b, as shown in FIG. 2, can be combined with the temperature control unit 10a described in connection with FIG. 1. If no temperature control unit is provided, condensation of some at least partially fluorinated fluoroketone could occur. The condensed component can be collected and reintroduced into the circulation of the insulation medium. Furthermore, the apparatus 2 can have a reserve volume of liquid at least partially fluorinated fluoroketone, liquid fluoroketone a) (or C5-ketone) and/or fluoroketone c) (or C6-ketone), and/or means for limiting a maximal permissible operating temperature of the desired insulation medium such that the absolute filling pressure is maintained below a given pressure limit of the apparatus 2.

Figure 3:
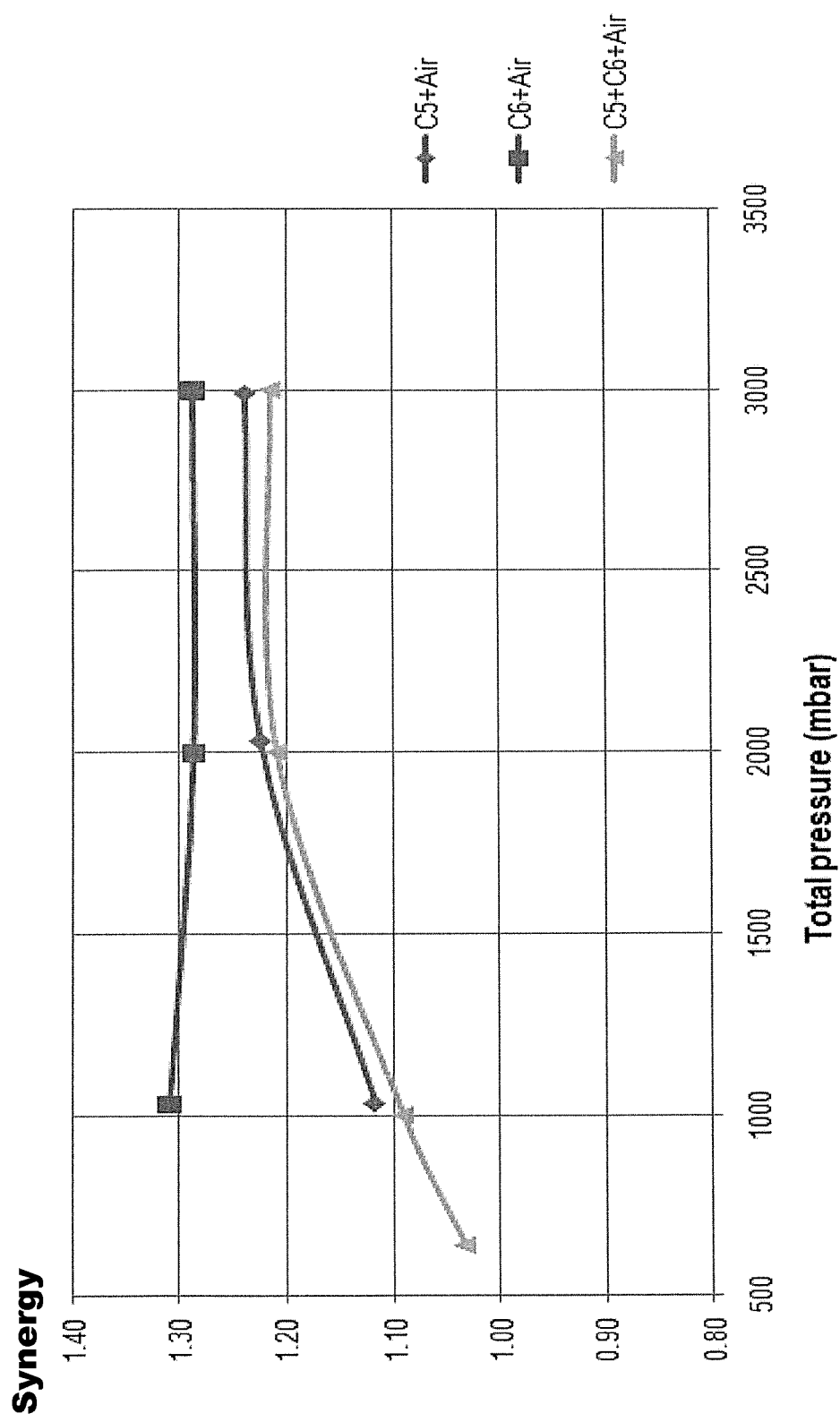
FIG. 3 shows a graphical representation of the synergy factor s as a function of the total pressure for various dielectric insulation media comprising exemplary fluoroketone-air mixtures.

FIG. 3 shows the non-linear or synergy factor s achieved by exemplary dielectric insulation media according to the present invention. The synergy factor s is shown for a first mixture C5-fluoroketone plus air (diamonds), a second mixture C6-fluoroketone plus air (squares), and a third mixture C5-fluoroketone plus C6-fluoroketone plus air (triangles) as a function of the total pressure $p_{abs}$, with the partial pressure $p_a$ of the fluoroketone being kept constant.

For the mixtures containing C5-fluoroketone (first and third mixture) the synergy factor s increases with an increase in the total pressure approximately up to 2 bar total pressure and then remains rather constant at approximately s=1.23, at least up to 3 bar total pressure. In contrast, the second mixture has relatively higher synergy factors of about 1.3 over a wide range of total pressures. As a rule, the synergy factor s is relatively low when the ratio of fluoroketone to air is high and increases with a decrease in the ratio of molar fractions $m_a$ or partial pressures $p_a$ of fluoroketone(s) to dielectric gas component b), here to air.

Figure 4:
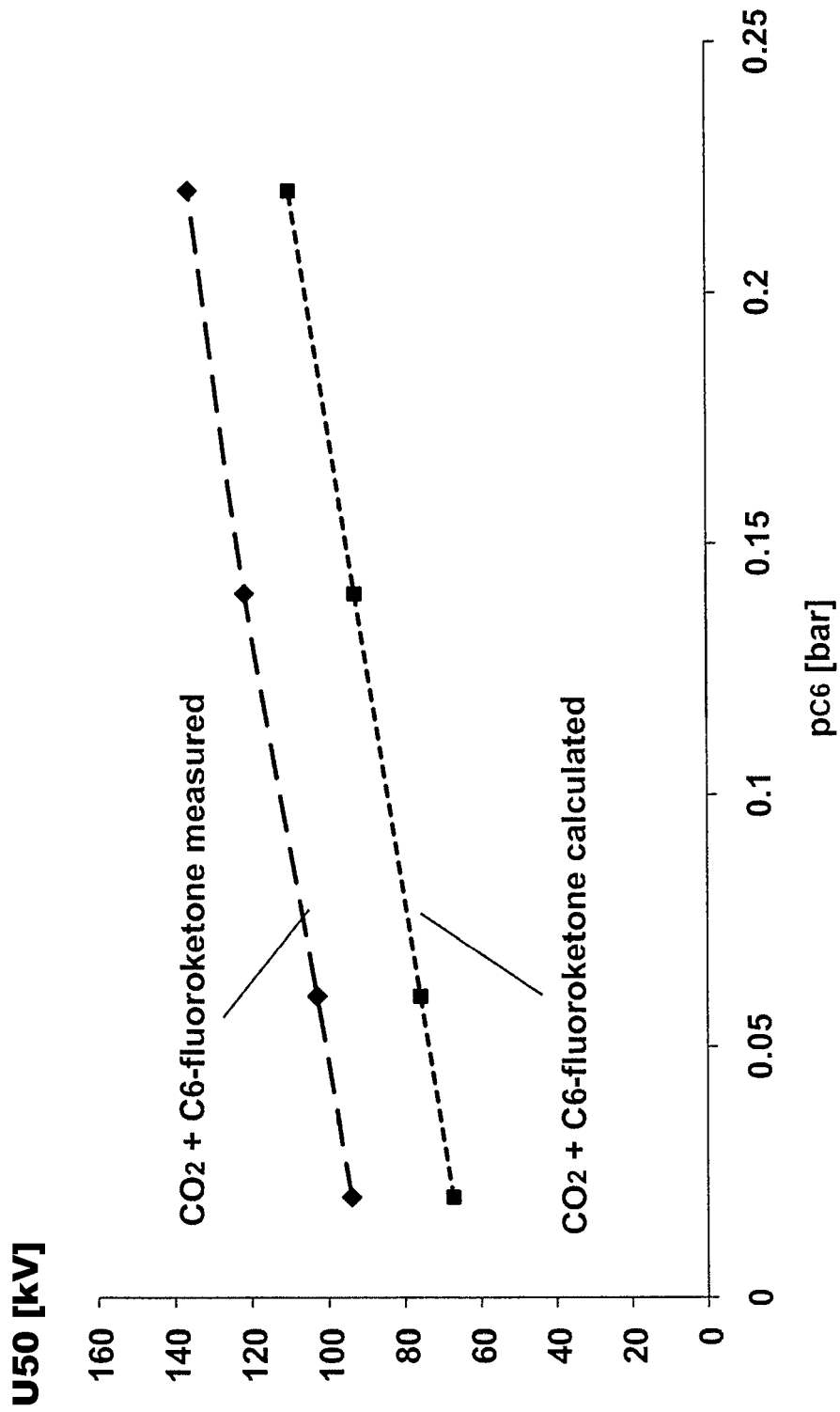
FIG. 4 shows a graphical representation of measured and calculated breakdown voltages U50 of a dielectric insulation medium comprising an exemplary fluoroketone-carbon dioxide mixture.

FIG. 4 shows the existence of the synergistic or non-linear effect achieved in a dielectric insulation gas mixture of C6-fluoroketone with carbon dioxide $CO_2$. FIG. 4 shows a breakdown voltage U50 in kV, measured with lightning impulses in a different measurement apparatus, as a function of the partial pressure $p_{C6}$ of the C6-fluoroketone, with the total pressure $p_{abs}$ being kept constant at 1 bar. Again, a strong non-linear increase of the measured dielectric strength of the mixture (diamonds) over the linearly calculated sum of dielectric strengths of the single components, C6 and $CO_2$, (squares) is proven. A strong synergy factor of approximately s=1.35 is found over a wide range of partial pressures $p_a$, or equivalently molar ratios $m_a$, of the C6-fluoroketone.

Furthermore, in other measurements the synergistic or nonlinear effect has also been shown in dielectric insulation gas mixtures comprising C6-fluoroketone, C5-fluoroketone and carbon dioxide.

These measurements are cited only as examples that prove the at least one synergistic or nonlinear increase in dielectric strength in mixtures, in particular gas mixtures, containing
  at least one first dielectric gas component L1) being selected from the first group consisting of: sulphur hexafluoride $SF_6$, perfluorocarbons, tetrafluoro methane $CF_4$, $C_2F_6$, $C_3F_8$, c-$C_4F_8$, $CF_3I$, nitrogen dioxide $NO_2$, nitric oxide NO, nitrous oxide $N_2O$, in particular sulphur hexafluoride ($SF_6$) and/or tetrafluoro methane ($CF_4$), and mixtures thereof, together with
  at least one second dielectric gas component L2) selected from the second group L2) consisting of: at least partially fluorinated fluoroketone, fluoroketone comprising exactly 5 carbon atoms, fluoroketone comprising exactly 6 carbon atoms, and mixtures thereof, together with
  at least one third dielectric gas component L3) selected from the third group consisting of: nitrogen, air, carbon dioxide, and mixtures thereof.

More specifically, in an exemplary embodiment of an aspect of the present invention, the dielectric insulation medium comprises always a fluoroketone FK, in particular C5-FK or C6-FK, and a breakdown field strength Ebd is established in a system, said Ebd being defined by the following equations:
if two gas components make a nonlinear synergistic effect:

$$Ebd=s(p_a,p_b)\cdot(p_a\cdot E_{crit,a}+p_b\cdot E_{crit,b})+p_c\cdot E_{crit,c}$$

in which $p_a$, $p_b$ are partial pressures of the pair-wise non-linearly interacting dielectric gas components a and b, e.g.: C5-FK/$N_2$, C6-FK/$N_2$, C5-FK/air, C6-FK/air, C5-FK/$CO_2$, C6-FK/$CO_2$;

$p_c$ is zero or is a partial pressure of another component c without nonlinear synergistic effect;

$E_{crit,a}$, $E_{crit,b}$, $E_{crit,c}$ are pressure-reduced electric breakdown field strengths of the dielectric gas components a, b, c, respectively, and $s(p_a, p_b)$ is a pair-wise synergy factor of the dielectric gas components a, b, with $Ebd_{measured}$ being a measured or actual breakdown field strength of the dielectric insulation medium comprising the dielectric gas components a, b, c, and $Ebd_{lin.calc}=(p_a\cdot E_{crit,a}+p_b\cdot E_{crit,b}+p_c\cdot E_{crit,c})$;

wherein the mixture is chosen such that the synergy factor s is greater than 1.

or if three gas components make a nonlinear synergistic effect:

$$Ebd=s(p_1,p_2,p_3)\cdot(p_1\cdot E_{crit,1}+p_2\cdot E_{crit,2}+p_3+E_{crit,3})$$

in which $p_1$, $p_2$, $p_3$ are partial pressures of the triplet-wise nonlinearly interacting dielectric gas components 1, 2 and 3, e.g. $SF_6$/C5-FK/$N_2$, $SF_6$/C6-FK/$N_2$; c-$C_4F_8$/C5-FK/$N_2$, c-$C_4F_8$/C6-FK/$N_2$; $SF_6$/C5-FK/air, $SF_6$/C6-FK/air; c-$C_4F_8$/C5-FK/air, c-$C_4F_8$/C6-FK/air; $SF_6$/C5-FK/$CO_2$, $SF_6$/C6-FK/$CO_2$; c-$C_4F_8$/C5-FK/$CO_2$, c-$C_4F_8$/C6-FK/$CO_2$; C5-FK/C6-FK/$N_2$, C5-FK/C6-FK/air, C5-FK/C6-FK/$CO_2$;

$E_{crit,1}$, $E_{crit,2}$, $E_{crit,3}$ are pressure-reduced electric breakdown field strengths of the gas components 1, 2, 3, respectively, and $s(p_1, p_2, p_3)$ is a triplet-wise synergy factor $Ebd_{measured}$/$Ebd_{lin.calc.}$, with $Ebd_{measured}$ being a measured or actual breakdown field strength of the dielectric insulation medium comprising the three dielectric gas components 1, 2, 3, and $Ebd_{lin.calc}=(p_1\cdot E_{crit,1}+p_2\cdot E_{crit,2}+p_3\cdot E_{crit,3})$;

wherein the mixture is chosen such that the synergy factor s is greater than 1.

Quadruplet-wise etc. synergies are possible as well, e.g. c-$C_4F_8$/C5-FK/air/$CO_2$ etc., and can be described analogously.

In other words, the mixture shall contain at least one specific second dielectric gas component L2), in particular a C5-fluoroketone, that together with the third dielectric gas component L3), in particular a carrier gas, and the first gas component L1) provides a non-linear increase in the dielectric strength over the arithmetic sum of the dielectric strengths of the gas components present in the mixture. This results in the synergy factor in the above equations being greater than 1.

In the context of the switchgears shown in FIG. 1 and FIG. 2 the term "at least partially fluorinated fluoroketone" shall comprise any variant according to any dependent claim or claim combination. It is noted that nominal current load generally facilitates the vaporization of the at least partially fluorinated fluoroketone, in particular fluoroketone a) (or C5-ketone) and/or fluoroketone c) (or C6-ketone), by the ohmic heating of current-carrying conductors.

According to the embodiments given above, the term "dielectric insulation medium" in this application shall be understood broadly to encompass a gaseous phase and possibly a liquid phase of the dielectric insulation medium. However, preferably the dielectric insulation medium, i.e. all components of the dielectric insulation medium, shall be present fully and exclusively in gaseous state under all operating conditions, in particular under all operating temperatures of the electrical apparatus. Furthermore, this term shall encompass a medium that has outstanding dielectric insulation capability or dielectric strength, for example in gas-insulated switchgear (GIS) or gas-insulated transmission lines (GITL), and/or has high performance for extinguishing electric arcs, for example arc faults in GIS or GITL or switching arcs in any sort of switch, disconnector, circuit breaker or the like.

The presence of $SF_6$, or of any compound or combination of compounds selected from the herein mentioned gas types different from fluoroketone and $SF_6$, may it be in combination with $SF_6$ or without $SF_6$— but always when in combination with the fluoroketone or fluoroketones—, can be in high or low quantity. In first embodiments, sulphur hexafluoride ($SF_6$), and/or tetrafluoro methane ($CF_4$) and/or $CF_3I$ and/or nitrogen oxides ($NO_2$, NO, $N_2O$), can be a bulk gas or buffer gas or carrier gas that is present in a larger quantity than the at least partially fluorinated fluoroketone. In particular, the sulphur hexafluoride ($SF_6$), and/or tetrafluoro methane ($CF_4$) and/or $CF_3I$ and/or nitrogen oxides ($NO_2$, NO, $N_2O$), is present in a quantity of larger than 60%, preferred larger than 70%, more preferred larger than 80%, even more preferred larger than 90%, particularly preferred larger than 95%, even more particularly preferred larger than 97%, and most preferred larger than 99%, of the insulation medium.

In second embodiments, the sulphur hexafluoride ($SF_6$) and/or tetrafluoro methane ($CF_4$) and/or $CF_3I$, is a gas that is present in a smaller quantity than the at least partially fluorinated fluoroketone. Preferably, the sulphur hexafluoride ($SF_6$), and/or tetrafluoro methane ($CF_4$) and/or $CF_3I$, is present in a quantity of less than 40%, preferred less than 30%, more preferred less than 20%, even more preferred less than 10%, particularly preferred less than 5%, even more particularly preferred less than 3%, and most preferred less than 1%, of the insulation medium.

In embodiments, the dielectric insulation medium has a non-linear increase of a dielectric strength over the sum of dielectric strengths of the gas components of the insulation medium. In other embodiments, the dielectric insulation medium has a global warming potential (GWP) over 100 years in the range of 20000 to 15000, or in the range of 15000 to 10000, or in the range of 10000 to 5000, or in the range of 5000 to 3000, or in the range of 3000 to 2000, or in the range of 2000 to 1000, or in the range of 1000 to 500, or below 500.

In embodiments, the dielectric insulation medium comprises an at least partially fluorinated fluoroketone which has a boiling point above −20° C., preferred above −15° C., more preferred above −10° C., even more preferred above −5° C., most preferred above 0° C. In further embodiments, the dielectric insulation medium comprises an at least partially fluorinated fluoroketone which has a boiling point lower than 50° C., preferred lower than 40° C., more preferred lower than 30° C., even more preferred lower than 20° C., most preferred lower than 15° C.

Further embodiments are given in dependent claims or in arbitrary combinations of the dependent claims and are herewith altogether literally cited in this description.

The constituents of the dielectric insulation medium, such as various kinds of $SF_6$ and/or $CF_4$ and/or $CF_3I$, fluoroketones and carrier gases, such as nitrogen and/or air and/or carbon dioxide and/or nitrogen oxides ($NO_2$, NO, $N_2O$), are herewith explicitly disclosed to be possible or to be present in any combinations, may it be pair-wise combinations, triplet-wise combinations, quadruplet-wise combinations, or the like, however always in combination with the fluoroketone or fluoroketones. Therefore, any listings of all such combinations are herewith made part of the disclosure.

Thus, in general terms, the invention encompasses a dielectric insulation medium, a use as a dielectric insulation medium, and an electrical apparatus that comprises: at least one partially fluorinated fluoroketone in a mixture with a component selected from the group consisting of: sulphur hexafluoride $SF_6$, perfluorocarbons, tetrafluoro methane $CF_4$, $C_2F_6$, $C_3F_8$, c-$C_4F_8$, trifluoroiodomethane $CF_3I$, nitrogen dioxide $NO_2$, nitric oxide NO, nitrous oxide $N_2O$, and mixtures thereof. In particular, the at least one fluoroketone is a fluoromonoketone. Furthermore in particular, the at least one fluoroketone is a fluoromonoketone containing at least 5 carbon atoms, preferably exactly 5 carbon atoms or exactly 6 carbon atoms or mixtures thereof.

The terms "preferable", "preferred", "more preferable", "in particular" shall solely mean "exemplary" and shall therefore signify embodiments or examples only, i.e. are to be understood as optional Furthermore, throughout this application, any disclosure of and claim on the dielectric insulation medium comprising an at least partially fluorinated fluoroketone according to the present invention and to any embodiments is also a disclosure of the use of such an at least partially fluorinated fluoroketone in or as a dielectric insulation medium, and this use is explicitly disclosed herewith and may be claimed as a use claim, in particular by replacing the term "Dielectric insulation medium comprising an at least partially fluorinated fluoroketone" with the term "Use of an at least partially fluorinated fluoroketone as, or in, a dielectric insulation medium". Vice versa, the use claim is also disclosed to be and may formulated as a claim on a dielectric insulation medium or apparatus comprising the components to be used for dielectric insulation.

The invention claimed is:

1. A dielectric insulation medium comprising
   a) sulphur hexafluoride ($SF_6$) in a mixture with
   b) at least one further component being an at least partially fluorinated fluoroketone having molar fraction of greater than 3%;
   the at least partially fluorinated fluoroketone having a boiling point above −20° C.;
   the at least partially fluorinated fluoroketone having the general structure

wherein R1 and R2 are at least partially fluorinated chains, said chains being independently from each other linear or branched and having from 1 to 10 carbon atoms; and
   the at least partially fluorinated fluoroketone having from 4 to 12 carbon atoms.

2. The dielectric insulation medium according to claim 1, the at least partially fluorinated fluoroketone having a boiling point lower than 50° C.

3. The dielectric insulation medium according to claim 2, the at least partially fluorinated fluoroketone having a boiling point lower than 30° C.

4. The dielectric insulation medium according to claim 2, the at least partially fluorinated fluoroketone containing exactly 4 or exactly 5 or exactly 6 carbon atoms.

5. The dielectric insulation medium according to claim 1, the fluoroketone being a perfluoroketone, and/or being a fluoroketone having a branched alkyl chain, and/or being a fluoroketone having fully saturated compounds.

6. The dielectric insulation medium according to claim 4, the at least partially fluorinated fluoroketone containing exactly 4 or exactly 5 or exactly 6 carbon atoms.

7. The dielectric insulation medium according to claim 1, the at least partially fluorinated fluoroketone containing exactly 4 or exactly 5 or exactly 6 carbon atoms.

8. The dielectric insulation medium according to claim 7, the dielectric insulation medium comprising at least one second further component being air or being an air component.

9. The dielectric insulation medium according to claim 8, the second further component being selected from the group consisting of nitrogen, oxygen, carbon dioxide and noble gases, and the dielectric insulation medium having a non-linear increase of a dielectric strength over the sum of dielectric strengths of the gas components of the insulation medium.

10. The dielectric insulation medium according to claim 1, the fluoroketone having the molecular formula $C_5F_{10}O$.

11. The dielectric insulation medium according to claim 10, the fluoroketone being selected from the group consisting of 1,1,1,3,4,4,4-heptafluoro-3-(trifluoromethyl)butan-2-one, 1,1,1,3,3,4,4,5,5,5-decafluoropentan-2-one and 1,1,1,2,2,4,4,5,5,5-decafluoropentan-3-one.

12. The dielectric insulation medium according to claim 1, the at least partially fluorinated fluoroketone having a molar fraction in the insulation medium ranging from 5% to 40%.

13. The dielectric insulation medium according to claim 1, the fluoroketone having the molecular formula $C_6F_{12}O$.

14. The dielectric insulation medium according to claim 1, the partial pressure of the at least one at least partially fluorinated fluoroketone or of each at least partially fluorinated fluoroketone corresponding at least approximately to its respective saturated vapour pressure at a minimal operating temperature of the dielectric insulation medium.

15. The dielectric insulation medium according to claim 1, wherein the sulphur hexafluoride ($SF_6$) is a bulk gas or buffer gas or carrier gas, and wherein the insulation medium a larger quantity, by volume, of the sulphur hexafluoride ($SF_6$) than that of the at least partially fluorinated fluoroketone.

16. The dielectric insulation medium according to claim 15, the sulphur hexafluoride ($SF_6$) being present in a quantity of larger than 60% of the insulation medium.

17. The dielectric insulation medium according to claim 15, the sulphur hexafluoride ($SF_6$) being present in a quantity of larger than 95% of the insulation medium.

18. The dielectric insulation medium according to claim 1, wherein the sulphur hexafluoride ($SF_6$) is a gas, and wherein the insulation medium includes a smaller quantity, by volume, of the sulphur hexafluoride ($SF_6$) than that of the at least partially fluorinated fluoroketone.

19. The dielectric insulation medium according to claim 18, the dielectric insulation medium comprising at least one second further component, the second further component comprising di-atomic molecules or being air or being an air component.

20. The dielectric insulation medium according to claim 19, the second further component being selected from the group consisting of nitrogen, oxygen, carbon dioxide and noble gases.

21. The dielectric insulation medium according to claim 18, the sulphur hexafluoride ($SF_6$) being present in a quantity of less than 40% of the insulation medium.

22. The dielectric insulation medium according to claim 18, the sulphur hexafluoride ($SF_6$) being present in a quantity of less than 5% of the insulation medium.

23. The dielectric insulation medium according to claim 1, the dielectric insulation medium comprising a second further component, the second further component comprising di-atomic molecules or being air or being an air component.

24. The dielectric insulation medium according to claim 23, the dielectric insulation medium having a non-linear increase of a dielectric strength over the sum of dielectric strengths of the gas components of the insulation medium.

25. The dielectric insulation medium according to claim 23, the second further component being selected from the group consisting of nitrogen, oxygen, carbon dioxide and noble gases.

26. The dielectric insulation medium according to claim 1, the dielectric insulation medium having a non-linear increase of a dielectric strength over the sum of dielectric strengths of the gas components of the insulation medium.

27. The dielectric insulation medium according to claim 1, the dielectric insulation medium further comprising at least one of air, nitrogen, and carbon dioxide.

28. The dielectric insulation medium according to claim 27, the fluoroketone comprising exactly 4 or exactly 5 or exactly 6 carbon atoms.

29. The dielectric insulation medium according to claim 1, the at least partially fluorinated fluoroketone being present at least partially in gaseous form in the mixture.

30. The dielectric insulation medium according claim 1, the dielectric insulation medium having a global warming potential (GWP) over 100 years in the range of 20000 to 15000, or in the range of 15000 to 10000, or in the range of 10000 to 5000, or in the range of 5000 to 3000, or in the range of 3000 to 2000, or in the range of 2000 to 1000, or in the range of 1000 to 500, or below 500.

31. The dielectric insulation medium according to claim 1, the at least partially fluorinated fluoroketone having a boiling point above 0° C.

32. The dielectric insulation medium according to claim 1, the fluoroketone being 1,1,1,3,4,4,4-heptafluoro-3-(trifluoromethyl)butan-2-one.

33. The dielectric insulation medium according to claim 32, the partial pressure of the at least one at least partially fluorinated fluoroketone or of each at least partially fluorinated fluoroketone corresponding at least approximately to its respective saturated vapour pressure at a minimal operating temperature of the dielectric insulation medium.

34. The dielectric insulation medium according to claim 1, the fluoroketone being 1,1,1,2,4,4,5,5,5-nonafluoro-2-(trifluoromethyl)pentan-3-one.

35. The dielectric insulation medium according to claim 34, the partial pressure of the at least one at least partially fluorinated fluoroketone or of each at least partially fluorinated fluoroketone corresponding at least approximately to its respective saturated vapour pressure at a minimal operating temperature of the dielectric insulation medium.

36. A dielectric insulation medium comprising
a) trifluoroiodomethane ($CF_3I$) in a mixture with
b) at least one further component being an at least partially fluorinated fluoroketone having molar fraction of greater than 3%;
the at least partially fluorinated fluoroketone having a boiling point above −20° C.;
the at least partially fluorinated fluoroketone having the general structure

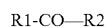

wherein R1 and R2 are at least partially fluorinated chains, said chains being independently from each other linear or branched and having from 1 to 10 carbon atoms; and
the at least partially fluorinated fluoroketone having from 4 to 12 carbon atoms.

37. The dielectric insulation medium according to claim 36, the at least partially fluorinated fluoroketone containing exactly 4 or exactly 6 carbon atoms.

38. The dielectric insulation medium according to claim 36, the at least partially fluorinated fluoroketone containing exactly 5 carbon atoms.

39. The dielectric insulation medium according to claim 36, comprising a second further component being selected from a group consisting of nitrogen, oxygen, carbon dioxide and noble gases, and the dielectric insulation medium having a non-linear increase of a dielectric strength over a sum of dielectric strengths of gas components of the dielectric insulation medium.

40. The dielectric insulation medium according to claim 36, the dielectric insulation medium comprising at least one second further component, the second further component comprising di-atomic molecules.

41. The dielectric insulation medium according to claim 36, the dielectric insulation medium comprising at least one second further component being air or being an air component.

42. A dielectric insulation medium comprising
a) at least one of tetrafluoro methane ($CF_4$) and a nitrogen oxide ($NO_2$, NO, $N_2O$), in a mixture with
b) at least one further component being an at least partially fluorinated fluoroketone having molar fraction of greater than 3%;
the at least partially fluorinated fluoroketone having a boiling point above −20° C.;
the at least partially fluorinated fluoroketone having the general structure

R1—CO—R2 wherein R1 and R2 are at least partially fluorinated chains, said chains being independently from each other linear or branched and having from 1 to 10 carbon atoms; and
the at least partially fluorinated fluoroketone having from 4 to 12 carbon atoms.

43. The dielectric insulation medium according to claim 42, the at least partially fluorinated fluoroketone containing exactly 4 or exactly 6 carbon atoms.

44. The dielectric insulation medium according to claim 42, the at least partially fluorinated fluoroketone containing exactly 5 carbon atoms.

45. The dielectric insulation medium according to claim 42, comprising a second further component being selected from a group consisting of nitrogen, oxygen, carbon dioxide and noble gases, and the dielectric insulation medium having a non-linear increase of a dielectric strength over a sum of dielectric strengths of gas components of the dielectric insulation medium.

46. The dielectric insulation medium according to claim 42, the dielectric insulation medium comprising at least one second further component, the second further component comprising di-atomic molecules.

47. The dielectric insulation medium according to claim 42, the dielectric insulation medium comprising at least one second further component being air or being an air component.

* * * * *